United States Patent
Franklin

[11] Patent Number: 6,156,357
[45] Date of Patent: Dec. 5, 2000

[54] FROZEN CONFECTION TYPE FOOD PRODUCT AND METHOD FOR MAKING SAME

[76] Inventor: Peter B. Franklin, 71 Deer Grass La., Concord, Mass. 01742

[21] Appl. No.: 09/339,891

[22] Filed: Jun. 25, 1999

Related U.S. Application Data

[63] Continuation-in-part of application No. 09/114,409, Jul. 13, 1998, abandoned.

[51] Int. Cl.[7] .................................. A23G 9/00; A23G 9/04
[52] U.S. Cl. ......................... 426/95; 426/101; 426/139; 426/283
[58] Field of Search .................................. 426/101, 100, 426/139, 95, 283

[56] References Cited

U.S. PATENT DOCUMENTS

| | | | |
|---|---|---|---|
| D. 285,620 | 9/1986 | Drazen | D1/101 |
| D. 286,731 | 11/1986 | Drazen | D1/101 |
| 1,901,394 | 3/1933 | Hassell | 426/101 |
| 2,517,756 | 8/1950 | Zabriskie, III et al. | 426/101 |
| 2,924,529 | 2/1960 | Renner | 99/137 |
| 4,104,405 | 8/1978 | Forkner | 426/94 |
| 4,427,703 | 1/1984 | Schäfer et al. | 426/101 |
| 4,910,030 | 3/1990 | Trojahn | 426/94 |
| 5,789,008 | 8/1998 | Monte | 426/293 |
| 5,843,512 | 12/1998 | Daouse et al. | 426/512 |

OTHER PUBLICATIONS

Fresh Ways With Pastries & Sweets; Chocolate Caramel Eclairs Time–Life Books 1988.
Snacks & Sandwiches; Chili Dog Time–Life Books 1980.

*Primary Examiner*—Nina Bhat
*Attorney, Agent, or Firm*—Pandiscio & Pandiscio

[57] ABSTRACT

An edible frozen confection food product and method comprises providing an elongated core of frozen confection and an elongated edible receptacle for receiving and retaining the core. The receptacle comprises a cake-like bun having first and second portions in part separated from one another to form a generally channel-shaped pocket, but joined. The core is disposed in the pocket and occupies a portion of the pocket less than a whole of the pocket.

21 Claims, 3 Drawing Sheets

FROZEN CONFECTION TYPE FOOD PRODUCT AND METHOD FOR MAKING SAME

CROSS-REFERENCE TO RELATED APPLICATION

This is a continuation-in-part of application Ser. No. 09/114,409, filed Jul. 13, 1998, abandoned in the name of Peter B. Franklin.

BACKGROUND OF THE INVENTION

1. Field of the Invention

The invention relates to edible food products and is directed more particularly to a frozen confection type of food product.

2. Description of the Prior Art

Edible food products having in combination a frozen component and a cake-like component are generally known. For example, ice cream sandwiches, ice cream cones, ice cream sticks, and ice cream cups are well known. Illustrations of ice cream sandwiches are shown in U.S. Design Pat. No. 285,620, issued Sep. 16, 1986 to Alan S. Drazen and U.S. Design Pat. No. 286,731, issued Nov. 18, 1986 to Alan S. Drazen. Ice cream sandwiches offer no platform for "add-ons", that is, edibles added to the basic combination, typically chocolate sauce, fruit-flavored sauces, chopped fruit, candy particles (such as "jimmies"), whipped cream, and the like. Ice cream sandwiches typically are pre-packaged with little consumer customization. That is, the type and/or flavor of the frozen component and of the cake-like component is beyond consumer control.

Other combinations are shown in U.S. Pat. No. 2,924,529, issued Feb. 9, 1960 to P.F. Renner, and U.S. Pat. No. 4,910,030, issued Mar. 20, 1990 to Charles J. Trojahn. Renner discloses an ice-cream type confection in which a core of ice-cream, or the like, is slid into a tubular-shaped receptacle of ice cream cone-like or ice cream sandwich wafer-like material. Trojahn discloses a confection having a core of frozen product, such as ice cream, in a frozen shell of cake-like material. Again, in the Renner and Trojahn confections there is no platform for add-ons and no opportunity for consumer customization.

Ice cream cones offer some opportunity for add-ons, though generally limited to a top of a top-most scoop of ice cream. Ice cream cones usually offer a limited range of choice relative to cones and a more extensive range of choice relative to the ice cream or other frozen confection. Ice cream sticks generally are pre-packaged and offer no consumer customization or add-on opportunity. Ice cream cups provide a platform for customization, such as receiving a host of add-ons, but such are usually available only at ice-cream parlors. Further, cups present a disposal issue relative to the remaining cup and spoon after the edible portion of the product is consumed.

Accordingly, there is a need for a frozen confection type of product which provides a platform for plentiful add-ons, and can be customized to a consumer's taste relative to both the frozen component and the cake-like component, and presents no disposal problem.

SUMMARY OF THE INVENTION

Accordingly, an object of the invention is to provide a quick-serve hand-held frozen confection which provides a platform for receiving plentiful add-ons and provides a range of customization for the customer relative to both the frozen confection component and the cake-like component, or bun, and which when consumed, leaves no implements requiring disposal.

A further object of the invention is to provide a method for making such a confection.

With the above and other objects in view, as will hereinafter appear, a feature of the invention is the provision of an edible frozen confection food product comprising an elongated core of frozen confection, and an elongated edible receptacle for receiving and retaining the core. The receptacle comprises a cake-like bun having first and second portions in part spaced from one another to form a generally channel-shaped pocket, and hingedly joined to each other along lengthwise edges of the first and second portions. The core is disposed in the pocket and occupies a portion of the pocket less than a whole of the pocket.

In accordance with a further feature of the invention, there is provided a method for making an edible food product, the method comprising the steps of providing an elongated core of frozen confection, providing an edible elongated receptacle for receiving and retaining the core, the receptacle comprising a bun having first and second portions spaced in part from one another but hingedly joined along lengthwise edges of the first and second portions to provide a channel-shaped pocket, and placing the core in the pocket such that the core occupies a portion of the pocket less than a whole of the pocket.

The above and other features of the invention, including various novel details of construction, combinations of parts, and method steps, will now be more particularly described with reference to the accompanying drawings and pointed out in the claims. It will be understood that the particular product and method embodying the invention are shown and described by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENT

Figure 1:
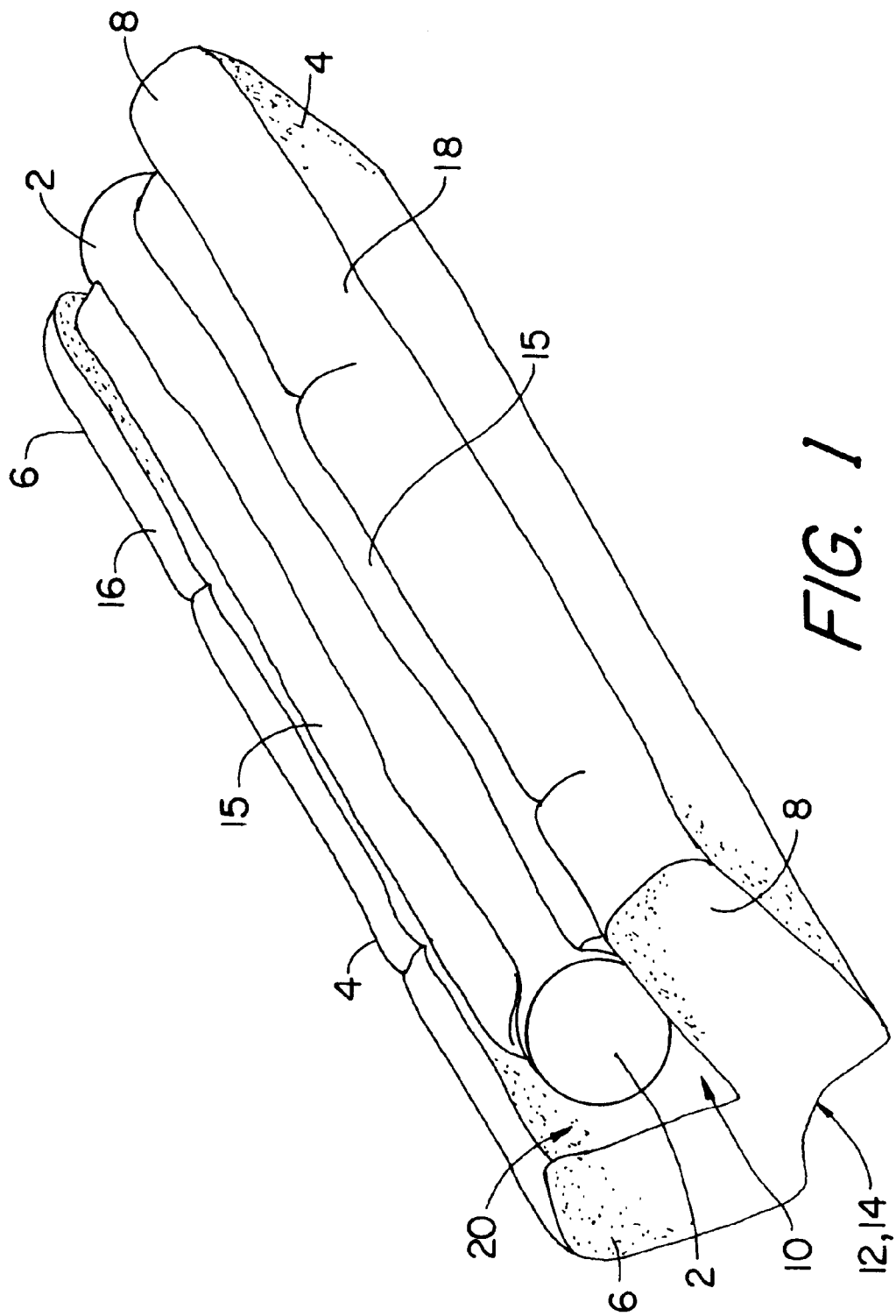
FIG. 1 is a perspective view of one form of edible frozen confection food product illustrative of an embodiment of the invention.

Referring to FIG. 1, it will be seen that one embodiment of the illustrative food product includes an elongated generally cylindrically-shaped core 2 of a frozen confection, such as ice cream, sherbet, sorbet, frozen yogurt, frozen custard, and the like (hereinafter, "frozen confection").

The illustrative food product further includes an elongated edible receptacle 4 for receiving and retaining the core 2. The receptacle preferably comprises a cake-like bun, or roll, or slice of cake-like material, similar to a slice of bread, folded over to form a bun-like configuration (hereinafter, "bun"). The bun includes first and second portions 6, 8 separable in part from one another to form a generally channel-shaped pocket 10, as shown in FIG. 1. The bun portions 6, 8 remain joined together along lengthwise edges 12 of the first and second portions, providing a "living hinge" 14 interconnecting the two bun portions 6, 8. The bun 4 preferably is an angle food cake, sponge cake, or similar type of cake, having a sweet taste, good resiliency, such that the living hinge 14 is able to maintain its integrity, and good absorbency so as to absorb melted confection from the core 2.

The core 2 is disposed in the pocket 10 and occupies a portion, but not all, of the pocket, leaving a portion of the pocket available for add-ons 15, preferably including one or more of chocolate sauce, fruit-flavored sauces, chopped fruit, candy particles (such as "jimmies"), and whipped cream, which can be disposed in the pocket 10 and adjacent to the core 2. Preferably, the bun 4 is of about the same length, or slightly longer, than the core 2.

In operation, a server removes the bun 4 from a wrapper and/or a container, such as a bread box. The first and second portions 6, 8 of the bun are in part separated to provide the channel-shaped pocket 10. The server then removes the core 2 from a freezer, which may be of a very small size and still provide room for a large number of cores. The core 2 is placed in the pocket 10. Free edge portions 16, 18 of the bun 4 are spaced from each other and, in conjunction with the core 2, define a pocket portion 20 for receiving the add-ons 15. The add-ons 15 are then added to the combination by placement in the pocket portion 20.

Figure 2:
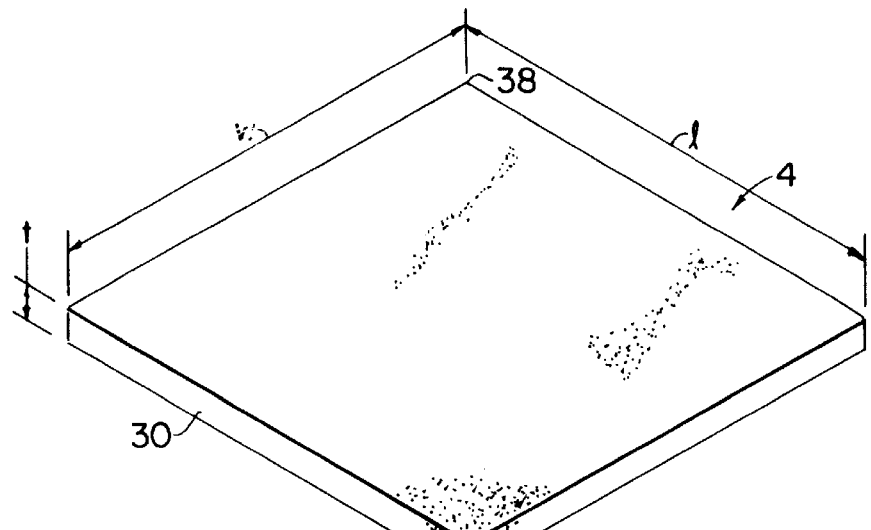
FIG. 2 is a perspective view of one form of bun component for use in the product shown in FIG. 1 and in an alternative embodiment shown in FIG. 4.

As noted above, the bun 4 may constitute a roll-type bun, as shown in FIG. 1, or a generally flat component 30 of cake-like material, as shown in FIG. 2. In the case of the former, the bun portions 6,8 usually are initially side-by-side and must be spread apart to provide the channel-shaped pocket 10. In the case of the latter, the flat component 30 must be folded, or bent into the channel configuration shown in FIG. 4 to provide the pocket 10.

Figure 3:
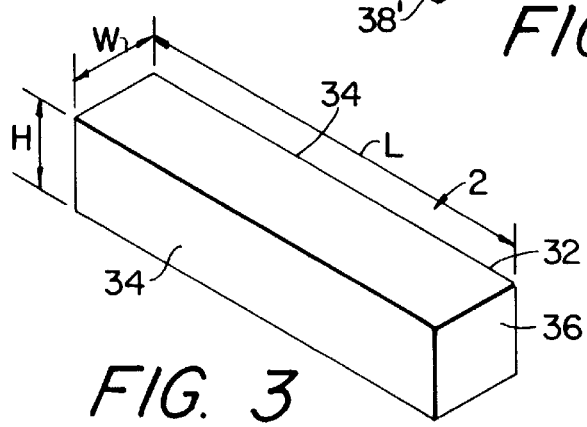
FIG. 3 is a perspective view of an alternative form of frozen confection component.

Referring to FIG. 3, it will be seen that an alternative core 2 comprises a generally rectangular solid core 32 having four generally equal rectangular sides 34, and generally equal rectangular ends 36. The core 32 is of the same frozen confectionery material as the core 2 shown in FIG. 1 and described above.

In operation, a server removes a flat component 30 from a wrapper and/or a container (not shown). The component 30 can be chosen from a selection of components, such as different flavored receptacles or receptacles of different consistency, such as "crumbly" or "spongy" cake-like materials.

Figure 4:
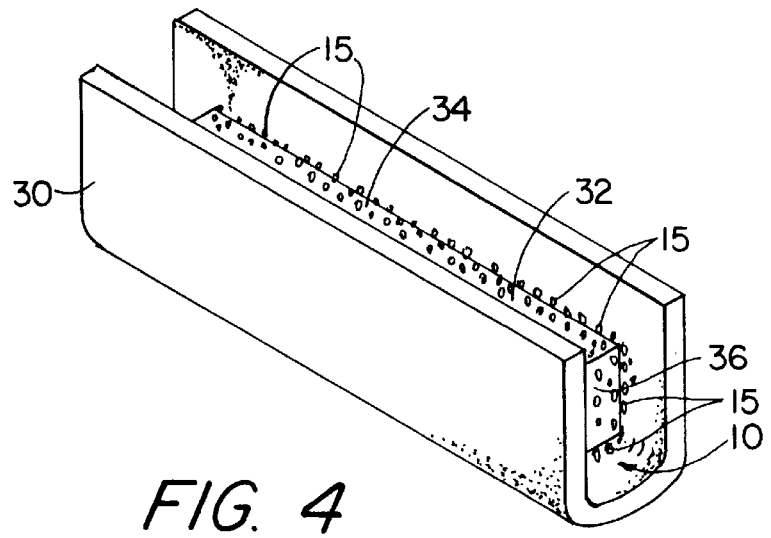
FIG. 4 is a perspective view of a combination of the bun component of FIG. 2 and the frozen confection component of FIG. 3.

Similarly, the core 32 is taken from a freezer and selected from various flavors and/or various frozen confections, such as ice cream, frozen yogurt, frozen custard, sherbet, and sorbet. The core 32 is placed on the component 30, which is bent upon itself and/or folded around the core 32 to nest the core 32 in the channel-shaped pocket 10 (FIG. 4). Add-ons 15 may then be placed in the pocket 10 adjacent the core.

Referring again to FIG. 2, in a preferred embodiment, the bun 30 is about ¼–⅜ inch in thickness (t) and is of a generally rectangular, preferably square, configuration of about 5 inches x5 inches (l,w). The frozen confection 32 is about 4½ inches in length (L) and about one inch in width (W) and height (H).

Figure 5:
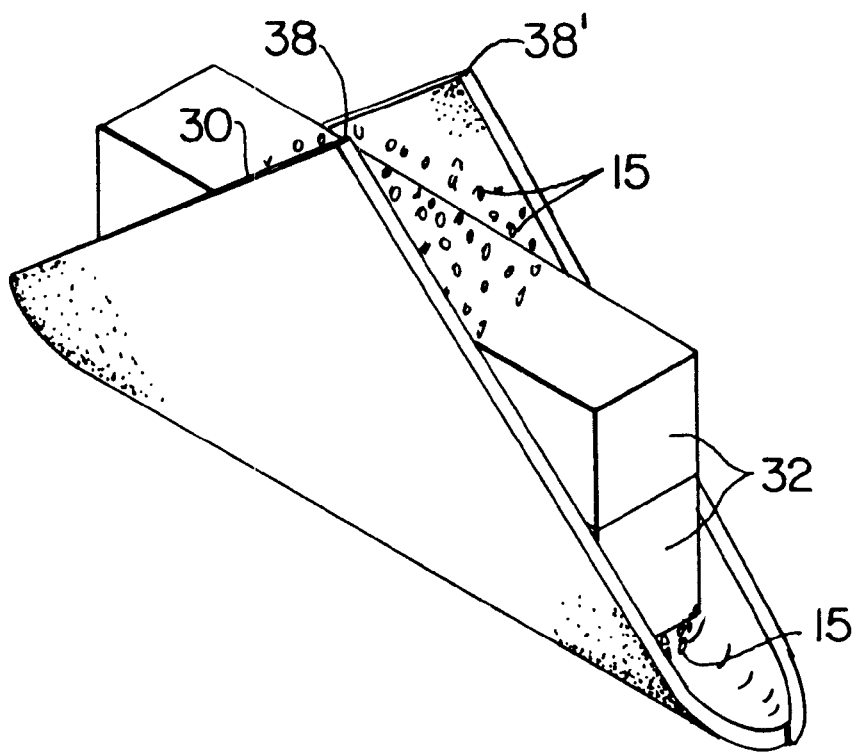
FIG. 5 is a perspective view similar to FIG. 4 but showing an alternative arrangement of components.
Figure 6:
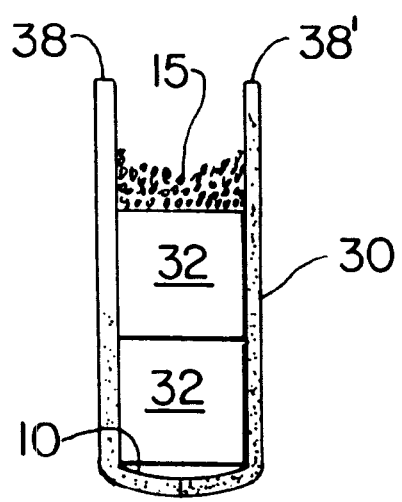
FIG. 6 is an end elevational view of the product of FIG. 5.

In FIGS. 5 and 6, there is illustrated an alternative arrangement of components 30, 32, wherein the bun 30 is folded upon itself tip to tip 38, 38', and two of the cores 32 are held therein. The bun 30 from tip to tip is about 7 inches long (T) and, when folded around the core 32 provides the channel-shaped pocket 10 with a bottom portion of about 1⅜ inches and upstanding side portions of nearly 3 inches each, still leaving room for the add-ons 15 when two cores 32 are used.

The bun 30 may be provided in the form of sponge cake baked in sheets for about ten minutes at 375° F. Typical flavors for the bun include lemon, chocolate, and vanilla. Further, add-ons may be added to the bun prior to cooking. For example, mini-M&Ms, when mixed in with the batter and subjected to the 375° F. temperature for the short baking time, melt sufficiently to blend into the batter, but remain sufficiently discreet from the cake to provide decidedly chocolate-flavored bites, somewhat as in chocolate chip ice cream. The aforesaid squares are separated from the sheet to provide buns about 5x5 inches square and about ¼–⅜ inch thick.

There is thus provided a frozen confection food product which can be made with components requiring little shipping and storage space, which is hand-held and may be consumed without the use of dishes or utensils, and which offers customization to consumers at the point of sale. The customization includes the ingredients selected for both the bun and the frozen confection, as well as the amount of frozen confection. A consumer may order a "large" or "small" dessert (two cores or one). Add-ons may be placed in the pocket, as desired, with respect to selection of type of add-on and quantity. Assembly can be effected by the consumer or the vendor. The assembled product may be consumed in a manner well known to consumers, i.e., in the manner of an ice cream cone or sandwich, without a container.

It is to be understood that the present invention is by no means limited to the particular construction and method steps herein disclosed and/or shown in the drawings, but also comprises any modifications or equivalents within the scope of the claims. For example, while point of sale assembly of the product is envisioned, as described above, to provide maximum customization at point of sale, it will be apparent that the bun, core and add-ons can be packaged and sold either fully assembled, or separated from each other and assembled by the consumer at a location removed from the point of sale.

What is claimed is:

1. A frozen confection food product comprising:
    an elongated core of frozen confection; and
    an elongated edible receptacle for receiving and retaining said core, said receptacle comprising a bun having first and second portions with first and second free edge portions, respectively, the free edge portions being spaced from one another and opposed to each other throughout the lengths thereof, and said first and second portions being joined to each other to form a generally U-shaped pocket;
    wherein said core is disposed in said pocket and occupies a portion of said pocket less than a whole of said pocket.

2. The food product in accordance with claim 1 and further comprising at least one add-on disposed in said pocket adjacent said core.

3. The food product in accordance with claim 2 wherein said add-on comprises at least one add-on selected from a group of add-ons consisting of chocolate sauce, fruit-flavored sauce, chopped fruit, candy particles and whipped cream.

4. The food product in accordance with claim 1 wherein said receptacle is of a length at least equal to a length of said core.

5. The food product in accordance with claim 1 wherein said core comprises at least one frozen confection selected from a group of frozen confections consisting of ice cream, sherbet, sorbet, frozen yogurt and frozen custard.

6. The food product in accordance with claim 1 wherein said bun is of a cake material having a sweet taste, resiliency sufficient to provide integrity to the juncture of said first and second portions, and absorbency sufficient to absorb melted confection from the core.

7. The food product in accordance with claim 1 wherein said core is of a width-wise cross-sectional configuration selected from a group of core cross-sectional configurations consisting of round and polygonal.

8. A food product comprising an elongated edible receptacle for receiving and retaining an elongated core of frozen confection, said receptacle comprising a bun having first and second portions having, respectively, first and second free edges spaced from one another and opposed to each other throughout the lengths thereof, said first and second portions being hingedly joined along a further lengthwise edge of said bun to one another to form a generally U-shaped pocket, said pocket being adapted to receive and retain the core in a portion thereof less than a whole thereof.

9. A frozen confection food product comprising:

an elongated core of frozen confection; and a generally rectangularly-shaped receptacle for folding upon itself to form a U-shaped pocket;

wherein said core is disposed in said pocket and occupies a portion of said pocket less than a whole of said pocket.

10. The food product in accordance with claim 9 wherein said core comprises at lease one frozen confection selected from a group of frozen confections consisting of ice cream, sherbet, sorbet, frozen yogurt and frozen custard; and said receptacle comprises baked sponge cake.

11. The food product in accordance with claim 10 wherein said sponge cake is about ¼–⅜ inch thick.

12. A method for making a frozen confection food product, the method comprising the steps of:

providing an elongated core of frozen confection;

providing an edible elongated receptacle for receiving and retaining the core, the receptacle comprising a bun;

shaping the bun into first and second portions having, respectively, free edges spaced from one another and opposed to each other along their entire lengths, the first and second portions being joined to provide a U-shaped pocket; and placing the core in the pocket such that the core occupies a portion of the pocket less than a whole of the pocket.

13. The method in accordance with claim 12, comprising the further step of placing an add-on in the pocket adjacent the core.

14. The method in accordance with claim 13 wherein the add-on comprises a material selected from a group of materials consisting of chocolate sauce, fruit-flavored sauce, chopped fruit, candy particles, and whipped cream.

15. The method in accordance with claim 12 wherein the core provided is of a material selected from a group of materials consisting of ice cream, sherbet, sorbet, frozen yogurt and frozen custard.

16. The method in accordance with claim 12 wherein the step of providing an edible receptacle comprises baking a sheet of sponge cake at about 375° F. for about 10 minutes to produce a sheet of sponge cake about ¼–⅜ inch thick, separating a generally rectangularly-shaped generally flat bun from the sheet, the bun being of about 5×5 inches.

17. The method in accordance with claim 16 wherein the step of shaping the bun comprises folding the generally flat bun upon itself to form the pocket.

18. The method in accordance with claim 17 wherein folding the bun upon itself comprises a selected one of (1) folding the bun to an ege-to-edge configuration, and (2) folding the bun to a tip-to-tip configuration.

19. The method in accordance with claim 18 wherein folding the bun comprises folding the bun to a tip-to-tip configuration, and includes the additional step of placing a second core in the pocket.

20. The method in accordance with claim 12 wherein the core is of a width-wise cross sectional configuration selected from a group of core cross-sectional configurations consisting of round and polygonal.

21. The method in accordance with claim 12 wherein the step of providing the bun comprises providing a substantially planar bun sufficiently flexible to facilitate said shaping of the bun.

* * * * *